S. E. & C. H. CARRINGTON.
Wheel Cultivator.
No. 21,739.
Patented Oct. 12, 1858.
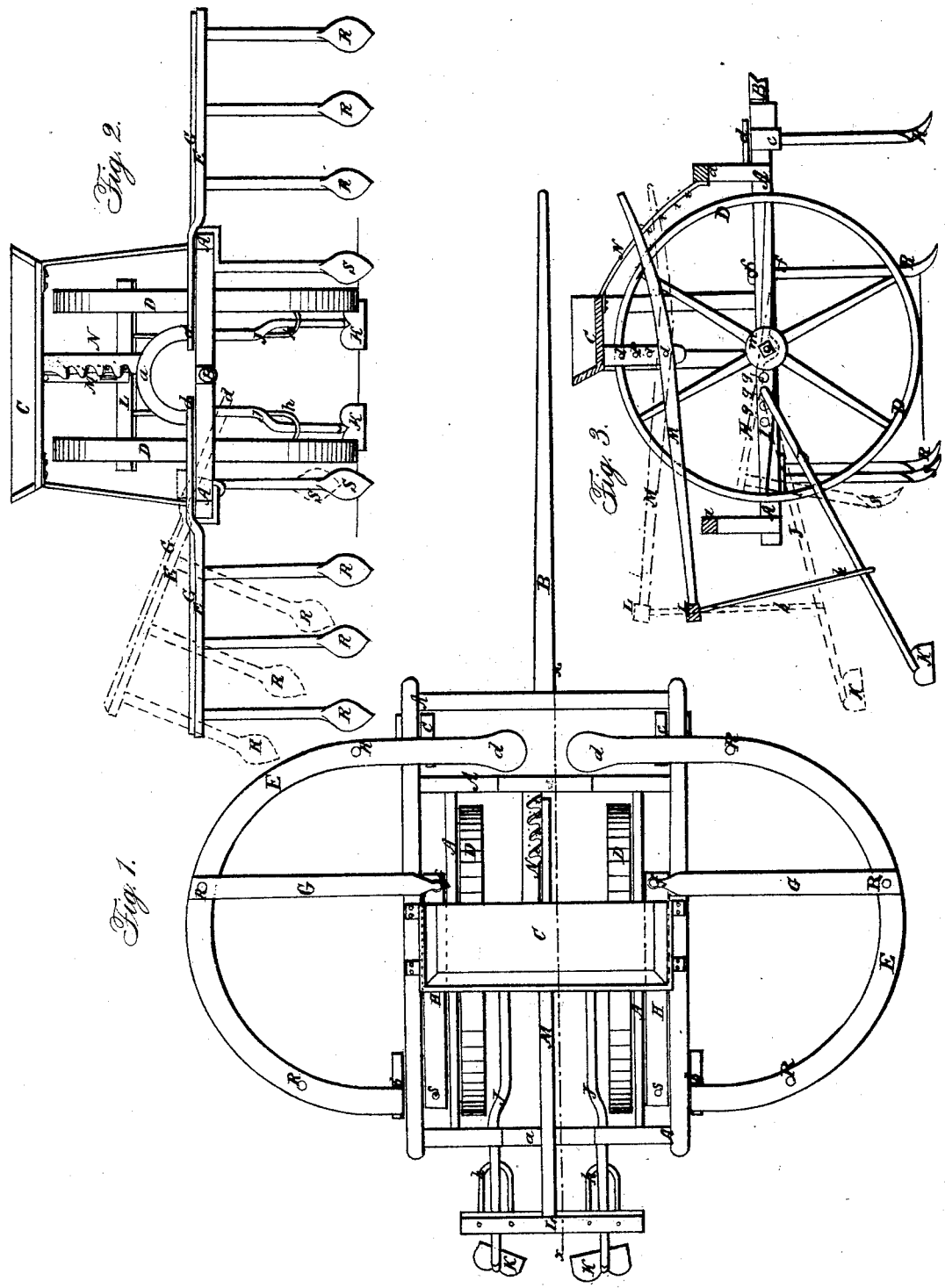

UNITED STATES PATENT OFFICE.

C. H. CARRINGTON AND S. E. CARRINGTON, OF WEYMOUTH, OHIO.

IMPROVEMENT IN CULTIVATORS.

Specification forming part of Letters Patent No. 21,739, dated October 12, 1858.

*To all whom it may concern:*

Be it known that we, C. H. CARRINGTON and S. E. CARRINGTON, of Weymouth, in the county of Medina and State of Ohio, have invented a new and Improved Cultivator for Corn and other Crops; and we do hereby declare that the following is a full and exact description thereof, reference being had to the accompanying drawings, making part of this specification—

Figure 1 being a plan of the cultivator; Fig. 2, a front elevation thereof; and Fig. 3, a vertical section of the same in the plane indicated by the line $x$ $x$, Fig. 1.

Like letters designate corresponding parts in all the figures.

We employ a central oblong frame, A, to which a tongue, B, is attached in any usual manner. The machine being intended to stride the rows or drills, the central part thereof is entirely clear, and the cross-pieces of the frame curve or bow upward, as shown at $a$ $a$ in the drawings, thus allowing corn or other vegetables growing at a considerable height to be passed over without injuring or disturbing it. This frame is supported by two wheels, D D, inside of its side beams and not very far from each other. They are mounted on separate axles, not crossing the space between each other, so as not to obstruct the central part of the implement. A seat, C, is mounted above and upon the frame for the reception of the driver.

The outer side teeth of the cultivator are inserted in wings E E, hinged to the sides of the frame A. These wings may be made of iron, and conveniently of a semicircular form, as represented. They are hinged to the frame in a peculiar manner, the rear hinges, $b$ $b$, being outside and the front hinges, $c$ $c$, being on the inside of the side beams of the frame, while the front ends of the wings extend inward toward each other and terminate in treadles $d$ $d$, substantially as shown. By this arrangement of the hinges and treadles the driver can, with his feet, raise one or both of the wings at pleasure, so as to elevate the teeth R R from the ground when desired.

The teeth S S, required beneath the frame A, are inserted in bars H H, extending lengthwise and just inside of the side beams of said frame, and being pivoted upon the axles $m$, Fig. 3, of the wheels. The teeth are secured to the rear ends of the bars, and to the front ends thereof are respectively hinged arms, G G, extending transversely inward from the wings E E, as represented. The hinges $f$ $f$ of these arms and bars being inside of the side beams of the frame A, and consequently inside of the lines between the hinges $b$ $c$ of the wings E E, whenever the said wings and their teeth are raised the front ends of the said bars H H are depressed, and hence their rear ends, with the teeth S S, are raised as desired, all as shown in red lines in Figs. 2 and 3.

In addition to the cultivating-teeth above specified we employ hoes K K, situated at a little distance from each side of the center of the cultivator for the purpose of weeding or cultivating close to the hills of corn or other crop. To these hoes we give motion similar to that given to hand-hoes in manual cultivation, substantially in the following manner:

The handles J J of the hoes extend forward, and are pivoted respectively to one of the spokes I, Fig. 3, of the wheels D D, there being different holes, $g$ $g$ $g$, in the spokes for receiving the pivots, so that the extent of motion communicated to the hoes may be varied at pleasure. The rear ends of the hoe-handles are supported and move backward and forward in suspended loops or stirrups $h$ $h$, which, together with the crank motion given to the forward ends of the handles, produce the required movement of the hoes. The said stirrups are suspended from a bar, L, which is attached to the rear end of a lever, M, extending forward beneath the seat $c$ to a hanger extending downward, from which seat it is pivoted. There is a set of holes, $l$ $l$ $l$, in said hanger P for adjusting the pivot of the lever to different heights, if required. In order, also, further to enable the driver to adjust the height of the stirrups $h$ $h$, and to raise and hold the hoes entirely from the ground, when desired, a catch-plate, N, is secured to the frame of the cultivator in front of the seat C. In the side or edge of this catch-plate is a set of notches, $i$ $i$ $i$, to receive the forward end of the lever M and retain it in the position required.

What we claim as our invention, and desire to secure by Letters Patent, is—

1. The arrangement and combination of the side wings, E E, and bars H H with each other and in relation to the frame A, substantially in the manner and for the purpose herein specified.

2. The mode of actuating and adjusting the hoes K K by means of the wheels D D, stirrups h h, bar L, lever M, and catch-plate N, arranged in combination and acting upon the handles J J of the hoes, substantially as herein set forth.

In witness that the above is a true specification of our improved cultivator we hereunto set our hands this 11th day of August, 1858.

C. H. CARRINGTON.
    S. E. CARRINGTON.

Witnesses:
  J. H. SEDGWICK,
  A. CARRINGTON.